United States Patent [19]

Kato et al.

[11] Patent Number: 4,673,254

[45] Date of Patent: Jun. 16, 1987

[54] BACK-REFLECTION TYPE LIGHT DIFFUSING APPARATUS

[75] Inventors: Kuniaki Kato; Mutsumi Takahashi, both of Tokyo, Japan

[73] Assignee: Tokyo Keiki Co., Ltd., Tokyo, Japan

[21] Appl. No.: 886,892

[22] Filed: Jul. 18, 1986

[30] Foreign Application Priority Data

Jul. 30, 1985 [JP] Japan ................... 60-168257

[51] Int. Cl.⁴ .................... G02F 1/13; F21V 7/00; F21V 3/00; F21V 5/00
[52] U.S. Cl. .................... 350/345; 362/297; 362/311
[58] Field of Search ............... 350/338, 345; 362/297, 362/311

[56] References Cited

U.S. PATENT DOCUMENTS

| | | | |
|---|---|---|---|
| 4,206,501 | 6/1980 | Brooks | 350/345 X |
| 4,487,481 | 12/1984 | Suzawa | 350/345 |
| 4,502,761 | 3/1985 | Knoll et al. | 350/345 |

*Primary Examiner*—John K. Corbin
*Assistant Examiner*—Richard F. Gallivan
*Attorney, Agent, or Firm*—Sandler & Greenblum

[57] ABSTRACT

A back-reflection type light diffusing apparatus of this invention is suitable for use in liquid crystal display panels or the like, and is formed by a light guiding plate. The light guiding plate has one surface which forms a first surface through which light is radiated while its opposite surface forms a second surface on which a light reflecting plate is mounted. The light reflecting plate is provided with non-reflecting portions disposed in such a manner that the area thereof increases the closer it gets to the light source so as to radiate light from the light radiating surface uniformly over its entire area.

12 Claims, 10 Drawing Figures

BACK-REFLECTION TYPE LIGHT DIFFUSING APPARATUS

BACKGROUND OF THE INVENTION

1. Field of the Invention

The present invention relates to a back-reflection type light diffusing apparatus, and more particularly, to a back-reflection type light diffusing apparatus suitable for use in liquid crystal displays or in seeing through drawings.

2. Description of the Prior Art

Generally, conventional back-reflection type light diffusing apparatuses for use in liquid crystal panel displays are formed of a light guiding plate having one surface which is formed into a light radiating surface and another surface onto which a light reflecting plate is mounted such that light is introduced from one or more positions at the peripheral end of the light guiding plate, and is radiated outwardly through one surface of the light guiding plate over its entire area on being reflected by the light reflecting plate mounted on the other surface thereof.

The conventional back-reflection type light diffusing apparatuses, however, suffer a problem in that more light is radiated in the vicinity of the light emitting portions, and less light is radiated from areas which are distant therefrom which are therefore darker in other words, light cannot be radiated uniformly over the entire area of the light radiating surface.

To obviate this problem, it has been proposed that the peripheral shape of the apparatus body 1 formed by a plate-shaped transparent member be modified, as shown in FIG. 1, in order to maximise the amount of light which passes through the central portion of the body. In the FIG. 1, reference numerals 2 and 3 respectively denote a light reflecting plate mounted around the sides of the body 1 and light sources.

However, such apparatuses have a complicated configuration, and their light sources are only mounted at a limited number of positions. Further, the configuration of such apparatuses has to be determined by a cut-and-try method, and therefore changes depending on the number and positions of the light sources provided. In consequence, much time and labour are required to determine the configuration.

SUMMARY OF THE INVENTION

Accordingly, an object of the present invention is to provide a back-reflection type light diffusing apparatus which is so improved as to radiate substantially uniform light over the entire light radiating surface thereof no matter how it is shaped, thereby eliminating the above-described problem of the prior art.

To this end, there is provided a back-reflection type light diffusing apparatus formed by a light guiding plate having one surface which forms a first surface through which rays of light are radiated and another surface which forms a second surface on which light is reflected such that light which is illuminated from a predetermined light source located near the lateral end of the light guiding plate is introduced thereinto and is radiated by the light radiating surface, wherein the light reflecting surface is so distributed that the area thereof decreases the closer it becomes to the light source.

In the back-reflection type light diffusing apparatus of this invention, rays of light introduced into the light guiding plate are diffused three-dimensionally, and are propagated by being repeatedly reflected by the first and second surfaces. Thus, light is reflected by the second surface in such a manner that it has a similar intensity over the entire second surface, since the light reflecting surface is so distributed on the second surface that the area thereof decreases the closer it becomes to the light source, thereby making it possible to radiate light substantially uniformly over the entire first surface.

DETAILED DESCRIPTION OF THE PREFERRED EMBODIMENT

An embodiment of the present invention will be described hereinunder with reference to FIGS. 2 to 5.

Figure 1:
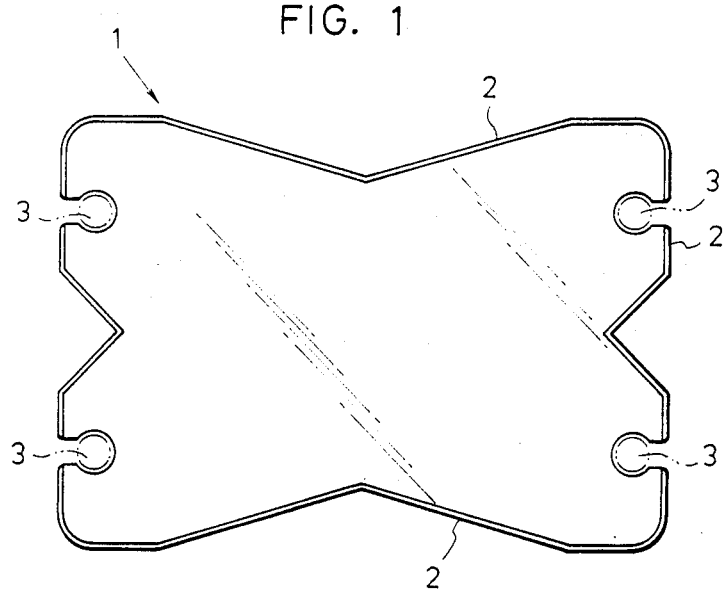
FIG. 1 is a plan view of a conventional back-reflection type light diffusing apparatus.
Figure 2:
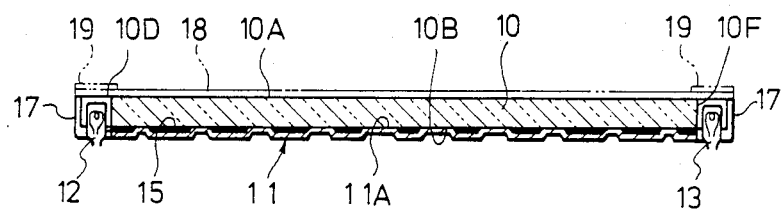
FIG. 2 is a cross-sectional view of an embodiment of a back-reflection type light diffusing apparatus according to the present invention.
Figure 3:
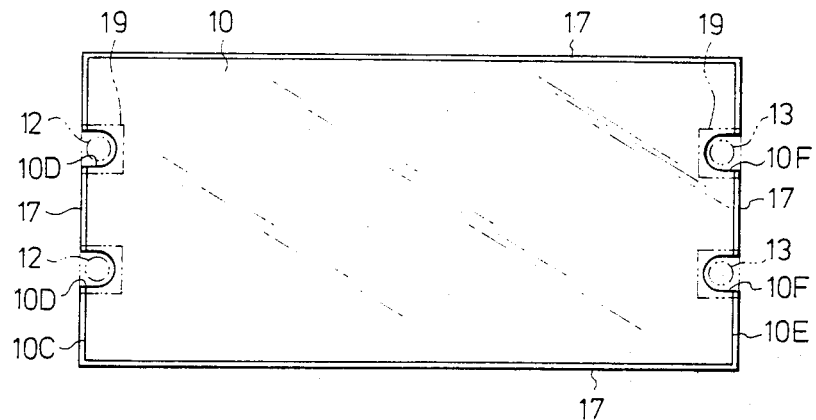
FIG. 3 is a schematic plan view of the back-reflection type light diffusing apparatus of FIG. 2.
Figure 4:
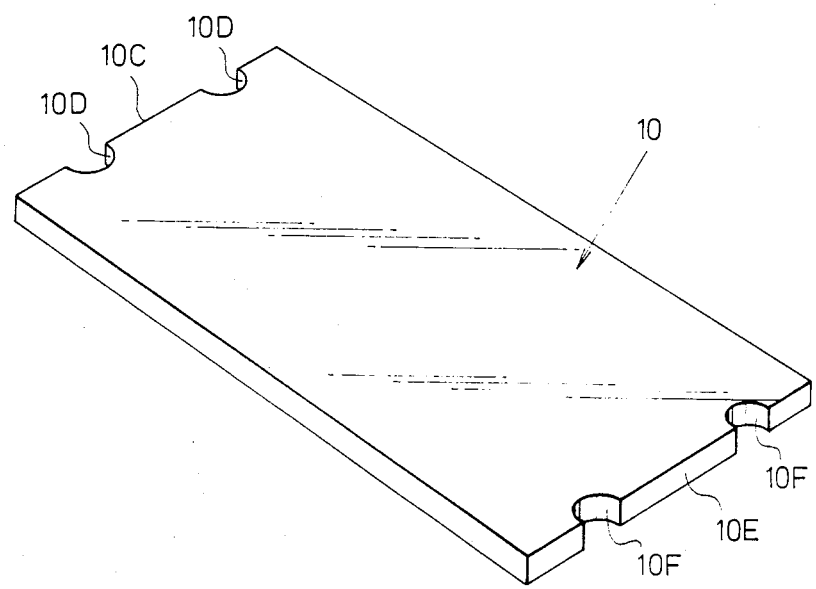
FIG. 4 is a perspective view of a light guiding plate constituting an essential part of the back-reflection type light diffusing apparatus.

Referring first to FIGS. 2 to 4, a light guiding plate 10 is formed of transparent plastic, and has a rectangular configuration. The light guiding plate 10 has one surface which forms a first surface 10A (the upper side as viewed in FIG. 2) through which light is radiated, and the other surface which forms a second surface 10B (the lower side as viewed in the same Figure) onto which a light reflecting plate 11 having a light reflecting surface 11A is mounted. The light guiding plate 10 is provided with a pair of notches 10D, 10D spaced at a predetermined interval from each other at one laterial end 10C thereof, and a light source 12 is disposed for illumination purposes, in each of the notches 10D, 10D. The other laterial end 10E of the light guiding plate 10 is also provided with a pair of notches 10F, 10F spaced at a predetermined interval from each other, and a light source 13 is disposed for illumination purposes in each of the notches 10F, 10F.

Figure 5:
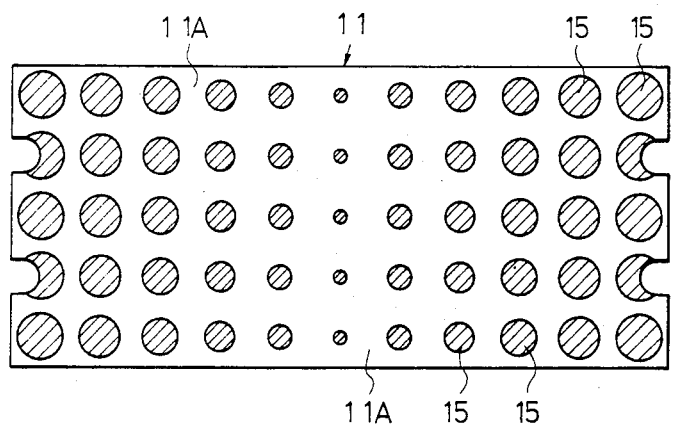
FIG. 5 illustrates the distribution of the reflecting surface and the non-reflecting surface of a light reflecting plate.
Figure 6:
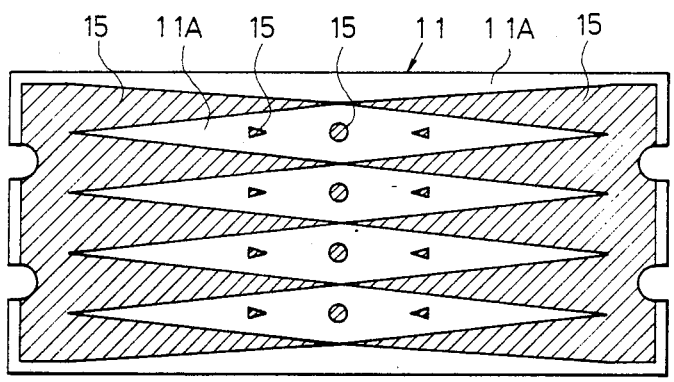
FIGS. 6 to 10 show modifications of the displacement of the reflecting surface and the non-reflecting surface.
Figure 7:
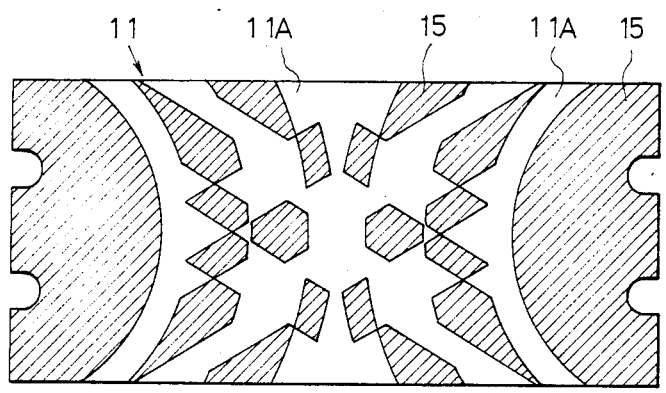
Figure 8:
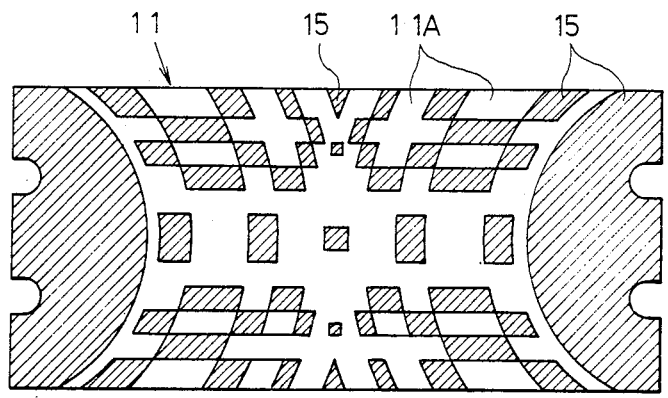
Figure 9:
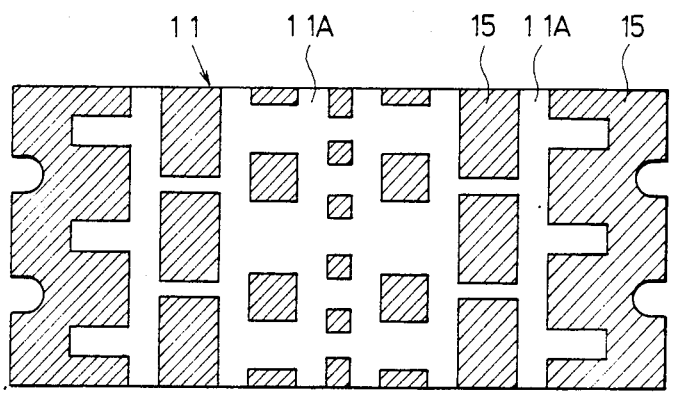
Figure 10:
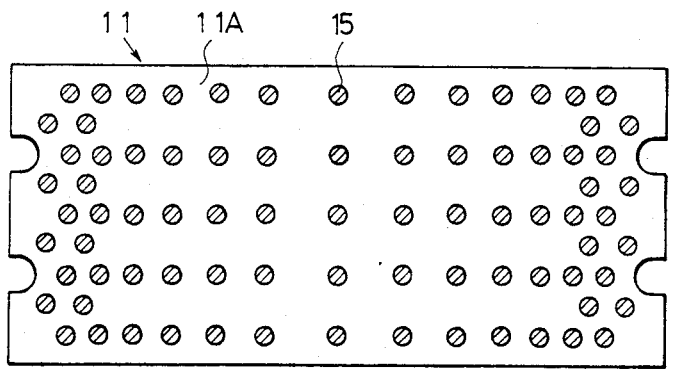

The light reflecting plate 11, as shown in FIG. 5, is made of a light reflecting material, thereby providing a light reflecting surface 11A. The large number of circular portions of various sizes in this drawing represent those which have a small reflectivity of light (hereafter referred to as "non-reflecting surface 15"). The non-reflecting portions 15 may be formed by a coating of black or gray paint using a suitable method as is employed in forming thick films. The thus-arranged light reflecting plate 11 is mounted on the light guiding plate 10 in such a manner that the light reflecting surface 11A and the non-reflecting surface 15 are made to make direct contact with the second surface of the light guiding plate 10 (see FIG. 2), so that the light reflecting surface 11A and the non-reflecting surface 15 are formed on the second surface 10B of the light guiding plate 10.

In the back-reflection type light diffusing apparatus of this embodiment, the area of the light reflecting plate 11 which is occupied by the non-reflecting surface 15 increases the closer it gets to the light sources 12 and 13 so that the ratio of the light reflecting surface 11A to the light reflecting plate 11 per unit area gradually decreases toward the light sources 12 and 13. More specifically, the non-reflecting surface 15 is so distributed on the second surface of the light guiding plate 10 that the area thereof decreases in proportion to the square of the distance from the light sources.

A light reflecting plate 17 is mounted on the periphery of the light guiding plate 10 except for the notches 10D and 10F. A light diffusing filter 18 made of a frosted glass is secured to the light radiating surface 10A of the light guiding plate 10. Film coatings 19 made of a material which does not transmit light are provided at the portions on the surface of the light diffusing filter 18 which correspond to the positions of the notches 10D and 10F, so as not to radiate large amounts of light near the light sources.

Operation of the back-reflection type light diffusion apparatus of the present invention will be described in detail.

The light emanating from the light sources 12 and 13 located at the ends of the light guiding plate 10 moves back and forth in the light guiding plate 10 by being repeatedly reflected by the light reflecting plate 17 mounted on the periphery of the light guiding plate 10, and is diffused three-dimensionally. On the other hand, the non-reflecting surface 15 and the light reflecting surface 11A which are formed on the second surface of the light guiding plate 10 in a matrix work together and reflect light in such a manner that it has a substantially uniform intensity over the entire second surface before it is radiated through the light radiating surface 10A of the light guiding plate 10.

The light radiating from the light radiating surface 10A passes through the light diffusing filter 18 of frosted glass which is mounted on the light radiating surface 10A. It is thereby scattered efficiently, and is radiated outwardly more uniformly as light illuminated from the surface illuminant which has few light and dark irregularities.

The thus-arranged back-reflection type light diffusing apparatus of this invention brings about the following effects.

If used in liquid crystal display panels, the apparatus provides a display which can be illuminated uniformly even at night, since uniform light is radiated from the light radiating surface 10A. If applied to a tracer's table by which drawings can be seen through, it can allow the device to be made smaller and adequately strong.

The apparatus of the present invention need not have a complicated end configuration which is required by the conventional apparatuses. The end of the apparatus can therefore be shaped in any form.

The distribution or size of the non-reflecting surface 15 mounted on the light reflecting plate 11 are not limited to those employed in the apparatus of this embodiment. It may also be distributed in any one of manners shown in FIGS. 6 to 10.

In these Figures, the portions provided with oblique lines represent the non-reflecting surface 15 as in the case of FIG. 5, while the other portions indicate the light reflecting surface 11A. As is clear from these Figures, these surfaces are so distributed that the ratio of the light reflecting surface 11A per unit area decreases the closer it gets to the notches 10D and 10F.

The apparatus of the present invention uses a rectangular light guiding plate 10. The present invention is not limited to this type of light guiding plate: a circular or square plate may also be employed. The light guiding plate 10 of the apparatus of this invention is made of transparent plastic. However, it may alternatively be formed of a translucent plastic, or a transparent or translucent glass. The apparatus of this invention is illuminated by four electric bulbs with two of them provided at each side. It may also adopt one electric bulb or two. Alternatively, it may adopt a fluoresent light or other light source disposed at both sides thereof, if it is to be applied to a device which is rather large in size. In such a case, the notches 10D and 10F need not be provided.

The light guiding plate 10 may be formed of water contained in a plate-like vessel. In the apparatus of this invention, the light source can be installed at any position, and the non-reflecting surface 15 can be formed in any pattern on the light reflecting surface 11A by printing, or by coating plastic or evaporating a suitable metal. The light diffusing filter 18 can have an opal or any other predetermined color.

As will be understood from the foregoing description, according to the present invention, substantially uniform light can be radiated over the entire light radiating surface no matter what shape the light guiding plate assumes.

What is claimed is:

1. A back-reflection type light diffusing apparatus including a light guiding plate having one surface which forms a first surface through which light is radiated and an opposite surface which forms a second surface against which light is reflected such that light illuminated from a predetermined light source located near the lateral end of said light guiding plate is introduced into said light guiding plate and is radiated from said light radiating surface,
wherein the area of said light reflecting surface is so distributed that it decreases the closer it becomes to said light source.

2. A back-reflection type light diffusing apparatus according to claim 1, wherein said light reflecting surface is formed by a light reflecting plate mounted on said second surface.

3. A back-reflection type light diffusing apparatus according to claim 2, wherein said light reflecting plate has a plurality of non-reflecting portions which are distributed in such a manner that the area thereof increases the closer they become to said light source.

4. A back-reflection type light diffusing apparatus according to claim 2, wherein said light reflecting plate has a plurality of non-reflecting portions which are densely distributed close to said light source.

5. A back-reflection type light diffusing apparatus according to claim 1, wherein said light guiding plate is provided with a light reflecting plate at the end of its periphery.

6. A back-reflecting type light diffusing apparatus according to claim 1, wherein said light radiating surface of said light guiding plate is covered with a light diffusing filter.

7. A back-reflection type light diffusing apparatus according to claim 6, wherein said light diffusing filter is formed of a frosted glass.

8. A back-reflection type light diffusing apparatus according to claim 6, wherein said light diffusing filter is coated with a translucent plastic.

9. A back-reflection type light reflecting apparatus according to claim 1, wherein light emanating from said light source is not illuminated directly from said light radiating surface of said light guiding plate.

10. A back-reflection type light reflecting apparatus according to claim 9, wherein said light radiating surface is provided with a member through which light is not transmitted at the portion thereof which corresponds to the position of said light source.

11. A back-reflection type light reflecting apparatus according to claim 10, wherein said non-light-transmitting member is formed by a coating of plastic.

12. A back-reflection type light reflecting apparatus according to claim 10, wherein said non-light-transmitting member is printed in a color through which light is not transmitted.

* * * * *